United States Patent [19]
Allen

[11] 3,869,905
[45] Mar. 11, 1975

[54] APPARATUS AND METHOD FOR TESTING ENGINE OIL PRESSURE

[76] Inventor: Marshall T. Allen, 4414 W. Hatcher Rd., Glendale, Ariz. 85302

[22] Filed: Nov. 19, 1973

[21] Appl. No.: 417,477

Related U.S. Application Data
[63] Continuation-in-part of Ser. No. 299,874, Oct. 24, 1972, abandoned.

[52] U.S. Cl. .................................. 73/119 R, 73/420
[51] Int. Cl. .......................................... G01m 15/00
[58] Field of Search.......... 73/119 R, 118, 116, 115, 73/420

[56] References Cited
UNITED STATES PATENTS

| 449,169 | 3/1891 | O'Brien............................ 138/90 |
| 848,759 | 4/1907 | Mern ................................ 138/90 |
| 2,729,339 | 1/1956 | McCoy....................... 73/119 R UX |
| 3,127,586 | 3/1964 | Heyn et al. ...................... 73/118 X |

Primary Examiner—Jerry W. Myracle
Attorney, Agent, or Firm—Herbert E. Haynes, Jr.

[57] ABSTRACT

An apparatus and method for use on an engine to isolate the oil pump assembly from the engine's lubricating system for indicating which of these is producing an oil pressure problem.

6 Claims, 2 Drawing Figures

APPARATUS AND METHOD FOR TESTING ENGINE OIL PRESSURE

CROSS REFERENCE TO RELATED APPLICATION

This application is a continuation in part of a copending U.S. Pat. application entitled ENGINE OIL PRESSURE TEST ADAPTER, Ser. No. 299,874 filed Oct. 24, 1972, now abandoned, by the same inventor.

BACKGROUND OF THE INVENTION

1. Field of the Invention

This invention relates to test equipment and a method for testing, and more particularly to an apparatus and method for testing oil pressure in an engine.

2. Description of the Prior Art

For purposes of this disclosure, the engine's oiling system is divided into two basic portions, with the first portion being the oil pump assembly. The second portion of the engine's oiling system will hereinafter be referred to as the engine's lubricating system and includes all those parts within an engine which are normally lubricated.

It is well known in the engine art that when an oil pressure problem exists on an engine, the problem can either result from a faulty oil pump assembly or from problems within the engine's lubricating system such as worn bearings and the like. If the problem is caused by the oil pump assembly, the work required and cost of correcting the problem is relatively low when compared to the work required and cost of overhauling the engine.

So far as is known to me, heretofore no method or apparatus, short of engine disassembly, existed which would enable a mechanic to isolate to any extent, the cause of an oil pressure problem and thus enable him to give a reasonable estimate of the costs of repair.

Therefore, a need exists for an apparatus and method for quickly determining if low oil pressure in an engine is due to a faulty oil pump assembly or is due to faults in the engine's lubricating system.

SUMMARY OF THE INVENTION

In accordance with the present invention, an apparatus and method is disclosed for quickly determining which portion of an engine's oil system is causing the oil pressure in that system to be low. The apparatus and method of the instant invention are intended primarily for use on engines which employ what is sometimes referred to as a spin-on type oil filter.

The spin-on oil filter is removed from the engine's oil filter mounting pad for purposes of this test and is replaced by an adapter means of the present invention. The oil supplied to the oil chamber of the mounting pad by the oil pump assembly is contained within that chamber by the adapter means. The adapter means also blocks the flow of oil which would otherwise be supplied to the engine's lubricating system from the mounting pad. Thus, the oil pump assembly is isolated from the engine's lubricating system so that only the output pressure of the oil pump assembly is reflected on an indicating means coupled to the adapter means. In other words, the oil pressure present in the oil chamber of the mounting pad is the output pressure of the oil pump assembly as that pressure cannot be affected by faults which may be present in the engine's lubricating system. Therefore, if it is known that a particular engine has an oil pressure problem, and a mechanic determines, by using the apparatus and method of the present invention, that the oil pump assembly is operating at its rated capacity, he will know that the oil problem is caused by faults within the engine's lubricating system.

Accordingly, it is an object of the present invention to provide a new and useful apparatus and method for testing oil pressure in an engine.

Another object of the present invention is to provide a new and useful apparatus and method for testing oil pressure in an engine to determine which portion of the engine's oil system is causing a problem in the oil pressure.

Another object of the present invention is to provide a new and useful apparatus and method for testing oil pressure in an engine of the type which employs a spin-on type oil filter for determining if the oil pump assembly or the engine's lubricating system is at fault in producing an oil pressure problem.

Still another object of the present invention is to provide a new and useful apparatus and method of the above described character which isolates the oil pump assembly from the engine's lubricating system so that the pump may be checked to see if it is operating at its rated capacity.

The foregoing and other objects of the present invention, as well as the invention itself, may be more fully understood from the following description when read in conjunction with the accompanying drawings.

DESCRIPTION OF THE PREFERRED EMBODIMENT

Figure 1:
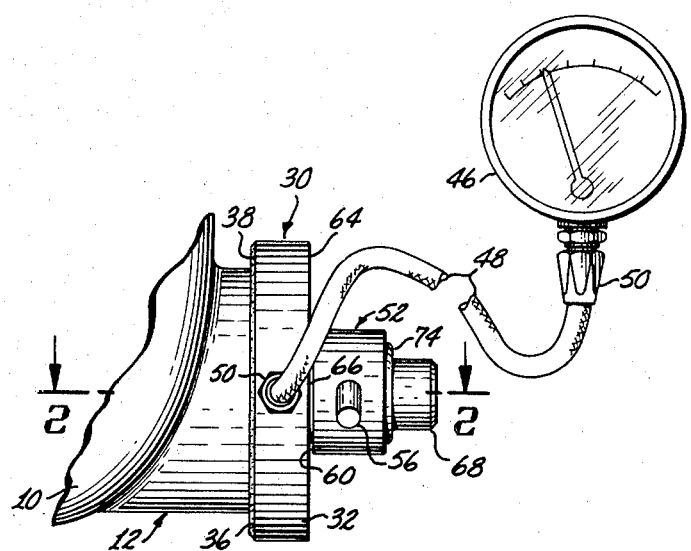
FIG. 1 is a fragmentary front elevation of an engine with the apparatus of the present invention installed on the oil filter mounting pad of the engine.

Referring more particularly to the drawings wherein there is illustrated a fragmentary portion of an engine 10 of the type which is provided with a filter mounting pad 12. The pad 12, during normal usage of the engine, has an oil filter (not shown) mounted thereon of the type sometimes referred to as a spin-on filter.

The pad 12 illustrated in the drawings is typical of this type of pad; however, it should be noted that these pads will vary somewhat from one engine to the next and it is not intended that the apparatus and method of present invention be limited to usage on a specific type of filter mounting pad. As will become apparent as this description progresses, the apparatus and method of the pressent invention may be used on all filter mounting pads of this general type currently being used.

The filter mounting pad 12 is provided with circular lip 14 which circumscribes an oil containing chamber 16 formed therein. A hollow externally threaded stud 18 is mounted in the center of the pad 12 and extends outwardly from the chamber 16 a distance somewhat beyond the lip 14. Oil is supplied directly from the usual oil pump (not shown) through an inlet passage 22 into the chamber 16.

During normal engine usage the oil supplied to the chamber 16 will be forced under pressure into the oil filter (not shown) and will emerge from the center of the filter through the stud 18 to the engine's oil galley passage 24, which directs the oil to the engine's lubricating system (not shown).

Some engines being manufactured today are provided with a filter by-pass valve 26 mounted within a passage 28 which leads from the chamber 16 to the galley 24. This valve 26, in normal operation, will open when the oil pressure exceeds a predetermined setting of the valve and thus oil will be supplied to the engine lubricating system even though the filter may become clogged.

The oil pressure test adapter means 30 of the present invention includes a plate 32 having a centrally located aperture 34 formed therethrough. The plate 32 is fabricated so that it may be mounted on the pad 12 with one of its faces 38 in juxtapositional relationship with the lip 14 and so that the stud 18 will extend in the aperture 34.

A sealing gasket 36 is suitably secured to the face 38 of the plate and is preferably made to substantially cover that face so that an effective leak proof seal may be obtained on each of the various types of mounting pads 12, the diameter of the lip 14 being one thing that varies from pad to pad.

The plate 32 is provided with an oil passage 40 formed therein which communicates between the face 38 of the plate 32 and internally threaded bore 42, or other suitable coupling means provided on the periphery of the plate 32. By way of example of a coupling means that would be a functional equivalent, a fitting (not shown) could be welded or otherwise attached thereto.

The gasket 36 is provided with a first aperture 35 formed therein which aligns with the aperture 34 of the plate 32, and a second aperture 37 which aligns with the oil passage 40 in the plate.

Figure 2:
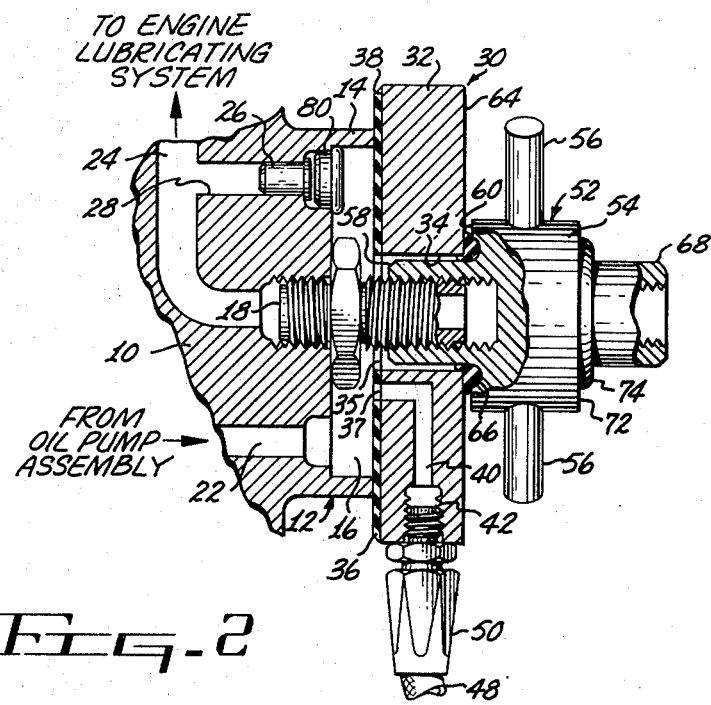
FIG. 2 is an enlarged sectional view taken on the line 2—2 of FIG. 1.

As seen in FIG. 1, an oil pressure gauge 46, or other suitable pressure indicating means may be coupled by the usual flex-hose 48 and fittings 50 to the bore 42. As seen best in FIG. 2, a mounting nut 52 is used to removably secure the plate 32 to the pad 12. The nut 52 has a head portion 54 preferably of cylinderical shape and has a pair of diametrically opposed radially extending pins 56 welded or otherwise secured thereto.

It should be obvious that any of several well known head configurations could be employed which would provide means by which the nut 52 can be gripped for axial rotation. For example, the head 54 could be hexagonal (not shown) so that the nut 52 could be tightened either by hand or with a suitable wrench.

The nut 52 is provided with at least one internally threaded boss 58 coaxially extending from the head 54, and of reduced diameter to form a shoulder 60 radially disposed between the periphery of the boss 58 and the periphery of the head 54.

The circumference of the boss 58 and the size of its internal threads are selected so that the boss may be inserted into the aperture 34 of the plate 32 and threadingly engage the stud 18 of the pad 12. As the nut 52 is tightened down on the stud 18, the shoulder 60 will come into contact with the face 64 of the plate 32 and move the plate into sealing engagement with the lip 14 of the pad 12. The shoulder 60 may be provided with an O-ring type sealing gasket 66, mounted thereon in any well known manner, to engage the face 64 of the plate 32 to prevent oil leakage through the aperture 34.

As hereinbefore mentioned, the various types of filter mounting pads 12 differ somewhat in the details of construction. One of these differences is the size of the stud 18. Therefore, so that the adapter means 30 of the present invention may be used on the various types of pads 12, the nut 52 may be provided with a second internally threaded boss 68. The second boss 68 coaxially extends from the opposite side of the head 54 of the nut 52 and is formed in the same manner as the boss 58, thus providing a shoulder 72 on which a gasket 74 may be mounted.

The only difference between the bosses 58 and 68 is the size of their respective internal threads, thus, the nut 52 is reversible to accommodate various sized studs 18 of the pads 12.

It should now be apparent that with the adapter means 30 of the present invention mounted as shown and described, the oil supplied to the chamber 16 of the pad 12 will be contained within that chamber and will be at pump pressure. This pressure will be sensed by the gauge 46 by means of the oil being supplied thereto through the oil passage 40 of the plate 32.

In an engine of the type having no by-pass valve 26, full pump output pressure will be indicated by the gauge. Thus, simply by knowing the rated output of the particular oil pump being tested, the mechanic can determine its condition. If the pump output pressure meets the requirements of the specification then the mechanic knows that the oil pressure problem of that particular engine is caused by the engine's lubricating system and can recommend an engine overhaul to his customer.

If the engine being tested is of the type which has a filter by-pass valve 26, the same analysis can be made by the mechanic. In this case, he installs a plug 80 in the oil passage 28 leading to the by-pass valve 26 to prevent oil from passing through the valve.

The method of the present invention may be easily understood after considering the steps of the method now to be described in detail.

The first step of the method of the present invention is removing of the spin-on type oil filter from the engine's oil filter mounting pad 12 to expose the oil inlet passage 22, the oil chamber 16 and the oil outlet passage through the hollow stud 18.

The second step of the instant method is sealing of the oil chamber 16 of the mounting pad 12 by installing the adapter means 30 of the present invention thereon as previously described so that the oil supplied to that chamber from the engine's oil pump assembly will be contained therein.

The third step includes blocking of the oil outlet passage through the hollow stud 18 to prevent oil from being directed through the outlet passage to the engine's lubricating system. This third step of blocking the oil outlet passage is accomplished by installing the nut 52 of the adapter means 30 on the stud 18 as hereinbefore described.

The fourth step comprises sensing of the pressure of the oil contained within the oil chamber 16 of the mounting pad 12 with the engine running to determine if the engine's oil pump assembly is operating at its rated capacity. The sensing of the oil pressure is accomplished by the oil pressure indicating means 46 which is coupled to the adapter means 30 and is in communication with the oil chamber 16 by means of the oil passage 40 formed through the plate 32.

An additional step will be requied when the engine to be tested is of the type equipped with the filter by-pass valve 26. This additional step includes plugging of the oil passage 28 leading to the filter by-pass valve 26 from the oil chamber 16 so that oil from that chamber is prevented from reaching the valve.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A method for testing oil pressure in an engine to determine if low pressure is being caused by a faulty oil pump assembly or by a faulty engine lubricating system, said method comprising the steps of:
   a. removing the spin-on oil filter from the oil filter mounting pad of the engine to expose the oil inlet passage, the oil outlet passage and the oil chamber thereof;
   b. sealing the oil chamber of said mounting pad to contain the oil supplied thereto from the oil pump assembly;
   c. blocking the oil outlet passage of said mounting pad to prevent oil from being supplied therefrom to the engine lubricating system; and
   d. sensing the pressure of the oil contained within the oil chamber of said mounting pad with the engine running to determine if the oil pump assembly is operating at its rated capacity.

2. A method for testing oil pressure as claimed in claim 1 comprising the additional step of plugging the filter by-pass valve, when said mounting pad is supplied with a by-pass valve, to prevent oil from passing therethrough to the engine lubricating system.

3. An apparatus for determining if low oil pressure in an engine is due to a faulty oil pump assembly or due to a faulty engine lubricating system comprising in combination:
   a. an engine having an oil filter mounting pad in which an oil chamber is provided for receiving oil from the oil pump assembly of said engine and from which oil is supplied to the lubricated parts of said engine through an externally threaded stud protruding from said mounting pad;
   b. adapter means sealingly demountably attached to the mounting pad of said engine for containing the oil supplied to the oil chamber of the mounting pad and preventing that oil from being supplied therefrom to the lubricated parts of said engine; and
   c. pressure indicating means coupled to said adapter means and in communication with the oil chamber of said mounting pad for sensing the pressure of the oil contained therein and giving a visual indication thereof.

4. An apparatus as claimed in claim 3 wherein said adapter means comprises:
   a. plate having an aperture formed therethrough for receiving the stud of said mounting pad, said plate having an oil passage formed therethrough to which said pressure indicating means is coupled;
   b. a gasket affixed on one surface of said plate for forming a seal between said plate and said mounting pad; and
   c. a mounting nut within the aperture of said plate and in threaded engagement with the stud of said mounting pad, said nut adapted to sealing demountably attach said plate to said mounting pad and to block the flow of oil through the stud of said mounting pad.

5. An apparatus as claimed in claim 4 wherein said mounting nut comprises:
   a. a head having means thereon by which said head may be gripped for axial rotation; and
   b. at least one internally threaded boss integral with said head and extending axially therefrom, said boss having a circumference which is smaller than the peripheral dimension of said head to form a shoulder therebetween.

6. An apparatus as claimed in claim 4 wherein said adapter means further comprises a plug for use in engines of the type employing a filter by-pass valve, said plug demountably inserted within the oil passage leading from the oil chamber of said mounting pad to the by-pass valve to block the flow of oil thereto.

* * * * *